J. DAVIS.
BRAKE SHOE HOLDER.
APPLICATION FILED MAY 5, 1915.
1,161,849.
Patented Nov. 30, 1915.
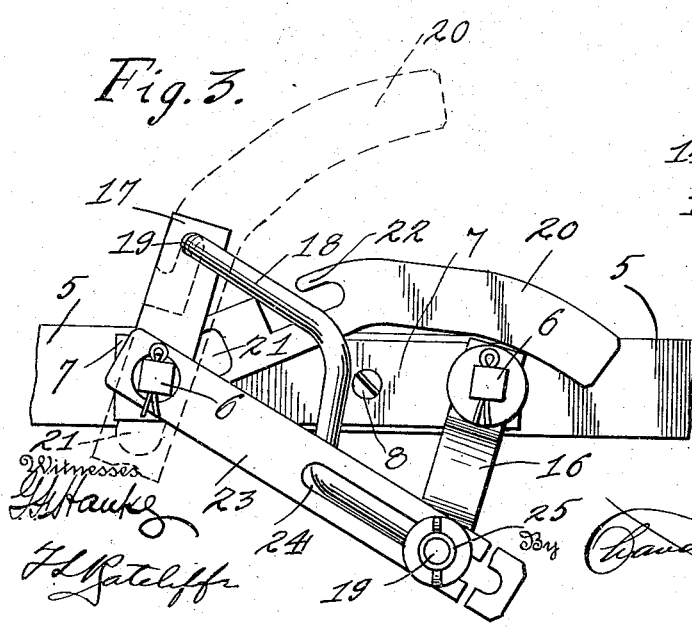
Witnesses
J. Hauke
F. L. Ratcliff
Inventor
J. Davis.
By Chandler & Chandler
Attorneys

UNITED STATES PATENT OFFICE.

JAMES DAVIS, OF ST. JAMES, MISSOURI.

BRAKE-SHOE HOLDER.

1,161,849.     Specification of Letters Patent.     Patented Nov. 30, 1915.

Application filed May 5, 1915. Serial No. 26,100.

*To all whom it may concern:*

Be it known that I, JAMES DAVIS, a citizen of the United States, residing at St. James, in the county of Phelps, State of Missouri, have invented certain new and useful Improvements in Brake-Shoe Holders; and I do hereby declare the following to be a full, clear, and exact description of the invention, such as will enable others skilled in the art to which it appertains, to make and use the same.

This invention relates to new and useful improvements in brakes for vehicles and is particularly directed to the provision of means associated with that type of brake including a transverse brake beam, whereby shoes may be readily secured to or detached from the beam.

It is the object of the present invention to provide such means for securing brake shoes to a brake beam, which is readily operable and does not require the use of a special type of shoe, and which is adjustable in nature to adapt it to shoe members of varying width.

It is further the object to provide such a securing means provided with a permanently connected handle member for operating the same to securing or released position and which has said handle member so associated therewith that when not in use, it may be positioned to lie along the beam.

With the above objects and advantages in view, the invention resides more particularly in the novel combination, formation and arrangement of parts more fully hereinafter described and particularly pointed out in the appended claims.

Reference is had to the accompanying drawings, wherein similar characters of reference designate corresponding parts throughout the several views and in which:

Figure 1 is a top plan view of the improved shoe securing means applied to a brake beam, Fig. 2 is a side view thereof with parts broken away, Fig. 3 is a view looking toward the other side of the device with the handle or actuating member illustrated in full lines in an inoperative position and in dotted lines in operative position, Fig. 4 is a sectional view taken longitudinally on the line 4—4 of Fig. 1. Fig. 5 is a transverse sectional view taken on the line 5—5 of Fig. 1, and Fig. 6 is a sectional view taken transversely on the line 6—6 of Fig. 2.

Referring now more particularly to the accompanying drawings, the improved device is shown in connection with one end portion 5 of a brake beam and includes a pair of spaced shafts 6 passed horizontally through the beam and through reinforcing straps 7 disposed at the sides of the beam, these straps being secured to the beam by screws 8 or the like, one screw 8 at the forward side of the beam also serving to hold a bowed metallic plate 9 which extends transversely of the beam and is adapted to be engaged by the brake shoe block 10, this block comprising merely a rectangular piece of wood of an approximate width to properly engage the wheel for braking action. For securely gripping and holding this block the forward ends of the shafts 6 are squared and passed through eccentrically disposed slots 11 formed in the web portions 12 of clamping cylinders 13, and wedge members 14 are also engaged in the said slots to bind the cylinders on the shafts. This is a desired structure, although it will be understood that any proper means for eccentrically securing the shafts may be employed. The outer peripheries of the cylinders are provided with series of teeth 15 and thus when the shafts 6 are rotated, the cylinders move together to engage their teeth in the block and securely hold said block against displacement.

The means for moving the shafts in opposite directions to actuate the cylinder to releasing or clamping positions comprises an arm 16 secured on the squared rear end of one of the shafts 6 and extending downwardly, and an arm 17 secured on the squared rear end of the other shaft 6 and extending upwardly, these arms having their free ends connected by a substantially Z-shaped link 18 the ends of which are laterally directed at 19 and pivotally passed through the arms. A handle lever for actuating this structure is provided which comprises a bar 20 formed in one end with a slot 21 loosely receiving that shaft 6 carrying the upstanding arm 17, and formed in its intermediate portion with an angular slot 22 adapted to engage with the adjacent portion 19 of the link in such manner that by rocking the lever, the shafts will be rocked. This lever may be readily disengaged from the portion 19 of the link and swung to lie along the beam, it being held against downward swinging movement by engagement with the shaft structure other than that to which it is attached.

The shafts are normally locked against relative rotation by means of a bar 23 pivoted on one of the shafts 6 and provided with a longitudinal slot 24 slidably receiving a portion 19 of the link adjacent the other shaft. A thumb nut 25 is threaded on said portion 19 and is adapted to clamp the link 23 to the arm 16 to prevent relative movement.

A comparatively simple and highly efficient device has thus been provided which may be very readily operated to remove or secure a brake shoe. It will be understood that various changes and modifications may be made within the scope of the appended claims without departing in any manner from the spirit of the invention. For instance, the clamping cylinders described form substantially cams on the shafts, and any desired cams may be used.

What is claimed is:

1. A securing means of the class described comprising the combination with a brake beam of a pair of shafts transversely carried thereby, cam members on said shafts, means for rotating said shafts in opposite directions and means for locking said shafts against rotation.

2. A securing means of the class described comprising the combination with a brake beam of a pair of shafts transversely carried thereby, cam members on said shafts, arms carried by the shafts, a handle member pivoted on one of the shafts and detachably engageable with the free portion of one of the arms and a link connection between the arms.

3. A securing means of the class described comprising the combination with a brake beam of a pair of shafts transversely carried thereby, cam members on said shafts, arms carried by the shafts, a link connecting said arms, a member secured to one of the shafts and slidably engaging the free end of the arm of the other shaft and means for locking said arm against sliding movement with relation to the member.

4. A securing means of the class described comprising the combination with a brake beam of a pair of shafts transversely carried thereby, cam members on said shafts, arms extending in opposite directions from said shafts, a link having its end portions laterally directed and pivotally engaged through the arms, a member secured on one of the shafts and provided with a longitudinal slot slidably receiving that laterally directed end of the link engaged with the arm of the other shaft, and a thumb nut on said end for clamping the arm and member together to lock the shafts against relative rotation.

In testimony whereof, I affix my signature, in the presence of two witnesses.

JAMES DAVIS.

Witnesses:
P. M. MOSEBY,
J. R. MATLOCK.

Copies of this patent may be obtained for five cents each, by addressing the "Commissioner of Patents, Washington, D. C."